US012247705B2

(12) United States Patent
Spencer et al.

(10) Patent No.: US 12,247,705 B2
(45) Date of Patent: Mar. 11, 2025

(54) DEVICE AND METHOD FOR FILLING CRYOGENIC TANKS

(71) Applicant: Chart Inc., Ball Ground, GA (US)

(72) Inventors: Logan Spencer, Woodstock, GA (US); Erik Gustafson, Woodstock, GA (US)

(73) Assignee: Chart Inc., Ball Ground, GA (US)

( * ) Notice: Subject to any disclaimer, the term of this patent is extended or adjusted under 35 U.S.C. 154(b) by 100 days.

(21) Appl. No.: 18/328,884

(22) Filed: Jun. 5, 2023

(65) Prior Publication Data

US 2023/0324007 A1 Oct. 12, 2023

Related U.S. Application Data

(63) Continuation-in-part of application No. 17/524,458, filed on Nov. 11, 2021, now Pat. No. 11,668,437.

(Continued)

(51) Int. Cl.
*F17C 5/02* (2006.01)

(52) U.S. Cl.
CPC ........ *F17C 5/02* (2013.01); *F17C 2205/0332* (2013.01); *F17C 2205/0338* (2013.01);

(Continued)

(58) Field of Classification Search
CPC ................ F17C 5/02; F17C 2205/0338; F17C 2225/0161; F17C 2227/0142;

(Continued)

(56) References Cited

U.S. PATENT DOCUMENTS

| | | | | |
|---|---|---|---|---|
| 11,384,903 | B2 * | 7/2022 | Beuneken | F17C 13/04 |
| 2004/0055316 | A1 * | 3/2004 | Emmer | F17C 7/04 62/50.6 |

(Continued)

OTHER PUBLICATIONS

International Search Report and Written Opinion, counterpart International App. No. PCT/US2024/010626 (May 8, 2024 (14 pages).

*Primary Examiner* — Timothy P. Kelly
*Assistant Examiner* — Christopher M Afful
(74) *Attorney, Agent, or Firm* — Cook Alex Ltd.

(57) ABSTRACT

A body structure includes an inlet port that receives fluid from a delivery device, a top-fill outlet port that connects to a top-fill line in communication with a cryogenic tank, a bottom-fill port that connects to a bottom-fill line in communication with a cryogenic tank and a slider tube cylinder. A cylinder housing is connected to the body structure and has a pressure comparison cylinder with an upper volume and a lower volume, with the latter in fluid communication with a cryogenic tank. A piston slides within the pressure comparison cylinder and a piston shaft is connected to the piston. A pressure regulator is in fluid communication with the upper volume of the pressure comparison cylinder and the slider tube cylinder. A slider tube is connected to the piston shaft and slides within the slider tube cylinder. The slider tube cylinder directs fluid to a top-fill line through the top-fill outlet port when a pressure in the lower volume exceeds a pressure setpoint and fluid to a bottom-fill line through the bottom-fill outlet port when the pressure in the lower volume is below a pressure setpoint. An over-pressure member is positioned in the upper volume of the pressure comparison cylinder. The piston contacts the over-pressure member as the piston slides upward in the pressure comparison cylinder.

21 Claims, 8 Drawing Sheets

Related U.S. Application Data

(60) Provisional application No. 63/479,293, filed on Jan. 10, 2023, provisional application No. 63/112,803, filed on Nov. 12, 2020.

(52) U.S. Cl.
CPC ................. *F17C 2223/0161* (2013.01); *F17C 2227/0142* (2013.01); *F17C 2250/043* (2013.01); *F17C 2260/021* (2013.01)

(58) Field of Classification Search
CPC ............ F17C 2250/03; F17C 2250/043; F17C 2250/0636; G05D 16/028
USPC .............................................................. 141/1
See application file for complete search history.

(56) References Cited

U.S. PATENT DOCUMENTS

| | | | |
|---|---|---|---|
| 2014/0007943 | A1 | 7/2014 | Mackey et al. |
| 2021/0372565 | A1 | 12/2021 | Beuneken et al. |
| 2022/0026028 | A1 | 1/2022 | Beuneken et al. |
| 2022/0146046 | A1 | 5/2022 | Gustafson |

* cited by examiner

DEVICE AND METHOD FOR FILLING CRYOGENIC TANKS

CLAIM OF PRIORITY

This application claims the benefit of U.S. Provisional Patent Application No. 63/479,293, filed Jan. 10, 2023, and is a continuation-in-part of U.S. patent application Ser. No. 17/524,458, filed Nov. 11, 2021, which claims the benefit of U.S. Provisional Application No. 63/112,803, filed Nov. 12, 2020, the contents of each of which are hereby incorporated by reference.

FIELD OF THE DISCLOSURE

The present disclosure relates generally to devices and methods for filing a cryogenic tank and, more particularly, to a device and method that fills a cryogenic tank with cryogenic fluid while automatically maintaining a predetermined setpoint pressure in the cryogenic tank.

BACKGROUND

Cryogenic fluids, that is, fluids having a boiling point generally below −150° C. at atmospheric pressure, are used in a variety of applications, such as mobile and industrial applications. Cryogenic fluids are stored in insulated cryogenic tanks because of the low temperature requirements (~−160° C.) and typically at lower pressures. Temperature and pressure regulation of cryogenic fluids in these tanks is extremely important.

Cryogenic tanks are typically filled from a mobile delivery unit that connects to the cryogenic tank. FIG. 1 illustrates a typical prior art example of system for filling a cryogenic tank. In the illustrated embodiment, the delivery unit connects to a cryogenic tank with a single point of connection for filling. The cryogenic tank system, indicated in general at 11, includes a cryogenic tank 1 with an inner shell 14 and an outer shell 17. Tank 1 contains a cryogenic liquid portion 3 and vapor headspace 2. Cryogenic tank 1 is in communication with a delivery device by delivery line 4 at delivery inlet 5. Delivery line 4 branches at intersection/junction 6 into two separate lines 7 and 8 in communication with the cryogenic tank 1. The first line 7 includes a path to top-fill the tank and the second line 8 includes a path to bottom-fill the tank. Each pathway contains at least one valve, which can be throttled to allow a desired amount of flow through each pathway. First line 7 is shown with valve 9 and second line 8 is shown with valve 10. Valves 9 and 10 are typically globe valves.

The cryogenic tank 1 is filled by introducing cryogenic fluid from a delivery device at inlet 5 through delivery line 4. The valves 9 and 10 on tank lines 7 and 8 are manually adjusted in order to deliver the fluid to the tank through the desired pathway. The cryogenic tank can be top-filled (i.e. the incoming fluid is sprayed into the vapor space 2 of the tank) through line 7 by opening valve 9. The tank can also be bottom filled through line 8 by opening valve 10. The cryogenic fluid being transferred from the mobile delivery unit is usually subcooled to some degree. That is, the pressure of the fluid as it flows through the transfer lines is greater than the saturation pressure of the fluid. When the fluid is transferred in this subcooled manner it does not boil in the lines and is thus transferred efficiently. The utility of having one path to top-fill the tank and one to bottom-fill the tank is for pressure balancing. Top-filling cools the vapor space 2 of the tank and reduces the tank pressure, which allows the tank to be filled without venting. On the other hand, bottom-filling the tank (i.e. the incoming fluid pushed into the liquid space by a dip tube or bottom nozzle) causes the liquid level to rise acting like a piston and increasing tank pressure.

The above-described system requires manual adjustment of the fill valves and monitoring during the fill process to maintain a desired cryogenic tank pressure. Typically, the mobile delivery unit includes an automatic fill shut-off that will stop fluid delivery to the tank 1 when the tank is full. There is a chance that the automatic fill shut-off will stop fluid delivery when the shut-off senses a drastic change or spike in fluid pressure in delivery line 4. Such changes in pressure can results from sudden opening or closing of valves 9 and/or 10. Premature stopping of fluid delivery results in an incomplete filing of tank 1. Maintaining a desired cryogenic tank pressure during filling therefore requires operators with a high level of skill, training and experience.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a device for filling a cryogenic tank includes a body structure, a pressure comparison cylinder, a piston, an over-pressure member, a pressure regulator, and a slider tube. The body structure includes an inlet port for receiving fluid from a delivery tank, a first top-fill outlet port configured to connect to a top-fill line in communication with a cryogenic tank, a bottom-fill outlet port configured to connect to a bottom-fill line in communication with a cryogenic tank, and a slider tube cylinder. The cylinder housing is connected to the body structure and defines a pressure comparison cylinder having an upper volume and a lower volume. The lower volume is in fluid communication with a cryogenic tank. The piston is slidably positioned in the pressure comparison cylinder and a piston shaft connects the piston to the slider tube. The pressure regulator is in fluid communication with the upper volume of the pressure comparison cylinder and the slider tube cylinder. An over-pressure member is positioned in the upper volume of the pressure comparison cylinder, the piston contacting the over-pressure member as the piston slides upward in the pressure comparison cylinder. The slider tube is slidably positioned within the slider tube cylinder. The slider tube cylinder is configured to direct fluid to the top-fill line through the top-fill outlet port when a pressure in the lower volume exceeds a setpoint pressure and to direct fluid to the bottom-fill line through the bottom-fill outlet port when the pressure in the lower volume is below the setpoint pressure.

In another aspect, a device for filling a cryogenic tank includes a body structure, a pressure comparison cylinder, a piston, an over-pressure member, a pressure regulator, and a slider tube. The body structure includes an inlet port for receiving fluid from a delivery tank, a first top-fill outlet port configured to connect to a top-fill line in communication with a cryogenic tank, a bottom-fill outlet port configured to connect to a bottom-fill line in communication with a cryogenic tank, and a slider tube cylinder. The cylinder housing is connected to the body structure and defines a pressure comparison cylinder having an upper volume and a lower volume. The lower volume is in fluid communication with a cryogenic tank. The piston is slidably positioned in the pressure comparison cylinder and a piston shaft connects the piston to the slider tube. The pressure regulator is in fluid communication with the upper volume of the pressure comparison cylinder and the slider tube cylinder. The slider tube is slidably positioned within the slider tube cylinder. The slider tube cylinder including a top-fill opening configured to direct fluid through the top-fill outlet port and a bottom-fill opening configured to direct fluid through the bottom-fill. The slider tube also including one or more crevices in fluid communication with the top-fill opening.

DETAILED DESCRIPTION OF EMBODIMENTS

An embodiment of the filing device of the disclosure provides a piston that compares a target setpoint pressure with the pressure of the tank being filled with cryogenic fluid and selectively diverts a flow stream to a top-fill and/or a bottom-fill pathway, or portions of flow to each pathway, based on the comparison, thus reducing or eliminating the need for monitoring and manually diverting the flow stream while operating the filling device to deliver cryogenic fluid to the tank.

Figure 1:
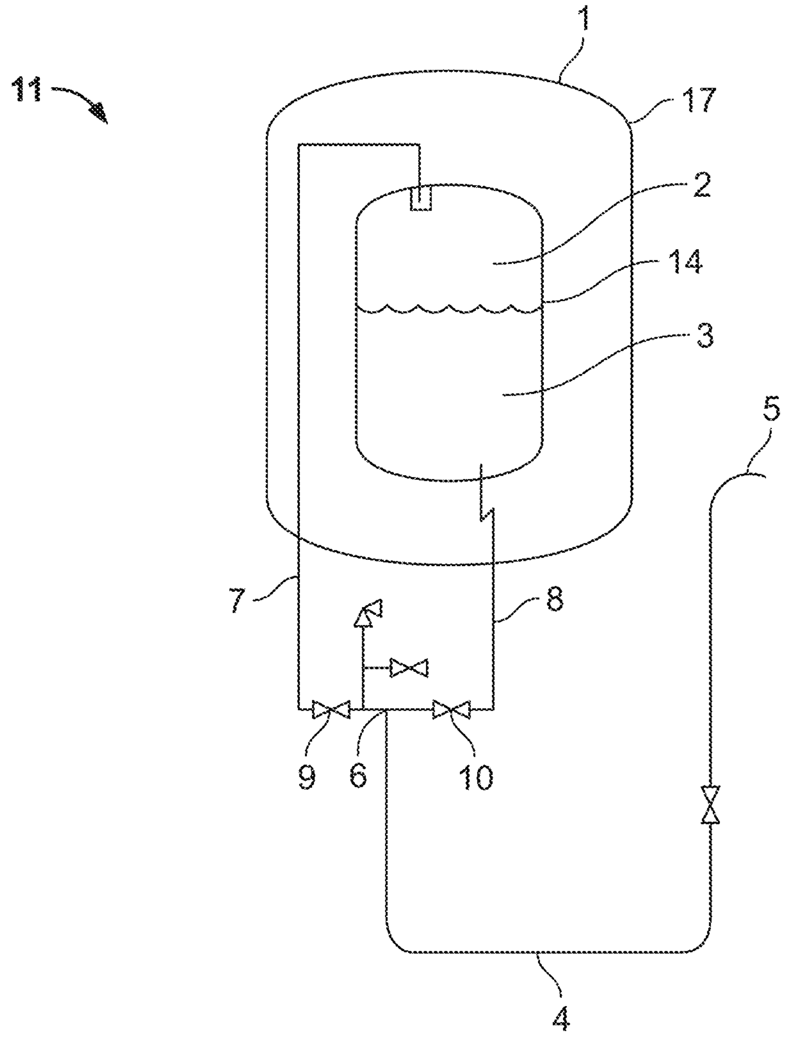
FIG. 1 (Prior Art)
FIG. 1 is a schematic illustration of a prior art system for filling a cryogenic tank.
Figure 2A:
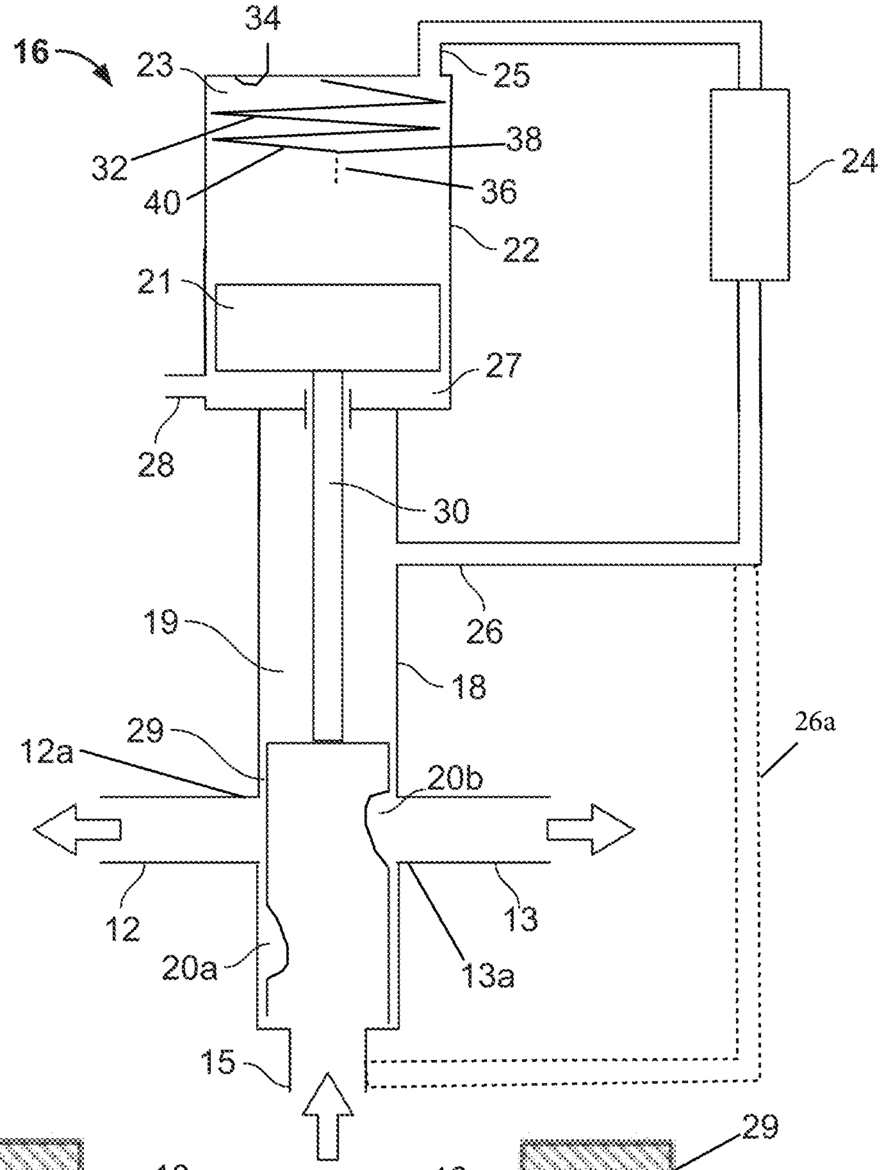
FIG. 2A is a schematic illustration of an embodiment of the filling device of the disclosure.

FIG. 2A illustrates an embodiment of the filling device 16 of the current disclosure. Filling device 16 delivers cryogenic fluid to a cryogenic tank. The filling device includes a body structure 18, a cylinder housing 22, a piston 21, an over-pressure member 32, a pressure regulator 24, and a slider tube 29.

As an example only, the body structure 18 may be tube-shaped. The body structure includes an inlet port 15 for receiving fluid from a delivery tank (such as the tank of a mobile delivery unit) or an alternative delivery device or system. The body structure also includes a top-fill outlet port 12*a* that leads to a top-fill line 12 in communication with a cryogenic tank being filled and a bottom-fill outlet port 13*a* that leads to a bottom-fill line 13 in communication with the cryogenic tank. The body structure 18 defines a slider tube cylinder 19 that slidably receives a slider tube 29. The slider tube 29 is able to slide up and down freely inside the slider tube cylinder 19.

Although specific detail is not shown in the figures, both the inlet and outlet ports can feature a number of specific fittings. For instance, each port may comprise a removable and reusable seal. Each port may also include a valve or vent. The inlet port 15 is connected to a delivery tank or other delivery device during filling, such as by a flexible hose or insulated piping.

The cylinder housing 22 defines a pressure comparison cylinder that slidably receives the piston 21. The piston 21 is able to slide up and down freely inside the pressure comparison cylinder. The pressure comparison cylinder includes two separate volume cavities: an upper volume 23 and a lower volume 27. The upper volume 23 is maintained at a predetermined setpoint pressure by the pressure regulator 24, as will be explained below.

Figure 4A:
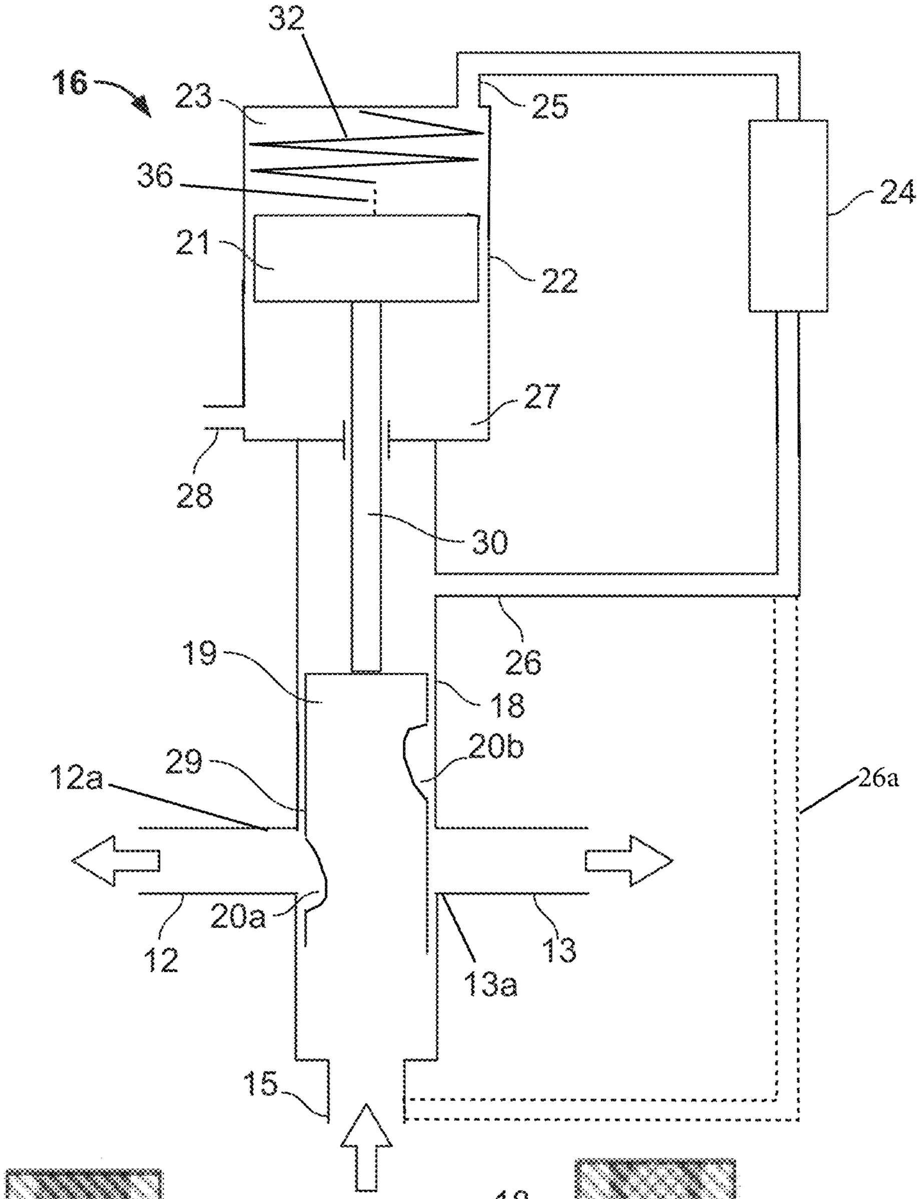
FIG. 4A is a schematic illustration of the filling device of FIG. 2A, showing the piston and slider tube moved upward.

An over-pressure member 32 is located in the pressure comparison cylinder. In the illustrated embodiment, the over-pressure member 32 is located in the upper volume or cavity 23 of the pressure comparison cylinder. In one alternative, for example, the over-pressure member 32 is above the piston 21 and between the piston 21 and the upper wall 34 of the pressure comparison cylinder. The over-pressure member 32 may be any suitable biasing member that biases or pushes the piston 21 away from the upper wall 34 until the upward force on piston 21 overcomes the force(s) of the over-pressure member 32 (i.e. when the device goes into "over-pressure"). In the illustrated embodiment, the over-pressure member 32 is a coil spring having a plurality of coils. Optionally, but not necessarily, the bottom end of the coil spring may include a finger 36 (shown in broken line) that protrudes downward from the coil spring and comes into contact with the piston 21 (FIG. 4A). The finger 36 may be located at the terminal end 38 of the bottom coil 40 of the coiled spring.

Figure 5A:
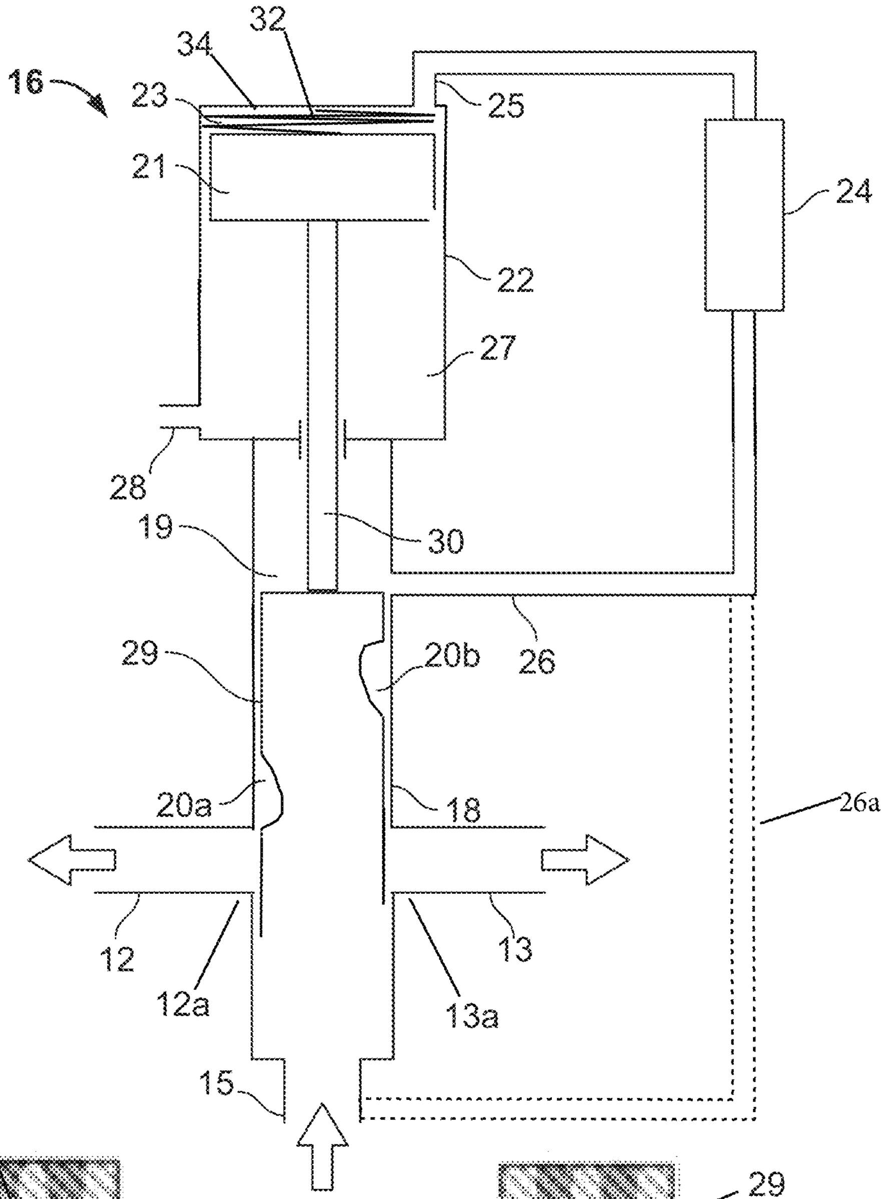
FIG. 5A is a schematic illustration of the filling device of FIG. 2A, showing the piston and slider tube in the top-most position.

The coiled spring has a preload and a spring constant that are tuned with a range of tank pressures. The preload is selected so that the piston pushes up against the spring but cannot displace it until there is enough pressure in the bottom chamber. Once there is enough pressure below the piston, a low spring constant allows the piston to move rapidly upward to generate a rapid flow change which will trigger the delivery vehicle to terminate the fill. Thus, as force within the headspace of the tank increases, the preload of the coiled spring holds the piston 21 in place until the pressure in lower volume 27 becomes greater than the preload of the coiled spring and the device goes into over-pressure. The piston 21 then compresses the coiled spring against the upper wall 34 of the pressure comparison cylinder (FIG. 5A). The coiled spring's spring constant (k) is such that the piston 21 rapidly slides or rapidly shuttles to its top-most position shown in FIG. 5A. The spring constant therefore determines how quickly the piston shuttles to its top-most position.

In alternative embodiments, the over-pressure member 32 may be any other suitable biasing member, such as any suitable type spring, bladder, elastic members, etc. that assists in the piston 21 rapidly moving to its top-most position.

The lower volume 27 is in fluid communication with the headspace of the cryogenic tank being filled via pressure sensing line 28 and therefore is maintained at the cryogenic tank pressure. The piston 21 preferably includes a seal between the piston 21 and the interior surface of the wall of the pressure comparison cylinder defined by cylinder housing 22 eliminating any type of communication or gas exchange between the upper volume 23 and the lower volume 27.

A piston shaft 30 is connected to the head of piston 21 and the slider tube 29. The piston shaft 30 also preferably includes a seal preventing exchange of fluid between the pressure comparison cylinder defined by cylinder housing 22 and the slider tube cylinder 19 of body structure 18.

As noted previously, pressure regulator 24, which is preferably a relieving pressure regulator, is used to maintain the pressure in upper volume 23 of the cylinder housing 22 at a generally constant setpoint pressure. Suitable pressure regulators are well known in the art and may include at least a valve that opens based on the pressure setting or setpoint to permit fluid to either enter the upper volume 23 (if the pressure within the upper volume is below the setpoint) or exit the upper volume (if the pressure within the upper volume is above the setpoint). The pressure regulator 24 is connected to the upper volume 23 of the pressure comparison cylinder and the slider tube cylinder 19/inlet port 15 through communication lines 25 and 26/26*a*, respectively. As shown in FIG. 2A, communication line 26 may be in communication with cylinder 19 and/or with fill inlet port 15 (alternative line 26*a* shown in broken line).

Piston 21 will move downward when the cryogenic tank pressure (which equals the pressure within lower volume 27) is below the setpoint pressure of regulator 24 and will move upward when cryogenic tank pressure exceeds the setpoint of regulator 24. In the latter instance, excess pressure caused by the displacement of piston 21 upwards is vented from the upper volume 23 to the atmosphere by pressure regulator 24 (via line 25), keeping upper volume 23 generally at constant setpoint pressure. When the pressure within the lower volume 27 (i.e. the cryogenic tank pressure) of the pressure comparison cylinder drops below the setpoint pressure, and thus the pressure within the upper volume 23, piston 21 will lower. As this occurs, the regulator 24 opens and pressurized fluid from the upper portion of slider tube cylinder 19 travels through lines 26 and 25 into the upper volume 23 so that the setpoint pressure may be maintained. When the setpoint pressure is reached within the upper volume 23, and downwards movement of piston 21 ceases, the regulator 24 closes.

The slider tube cylinder 29 is configured to direct a greater portion of fluid from a flow stream entering inlet port 15 of the device to a cryogenic tank top-fill line 12 through top-fill port 12*a* (to decrease the cryogenic tank pressure) when a pressure in the lower volume 27 of the pressure comparison cylinder exceeds a pressure setpoint and to direct fluid to a cryogenic tank bottom-fill line 13 through the bottom-fill outlet port 13*a* (to increase the cryogenic tank pressure) when the pressure in the lower volume 27 is below a pressure setpoint. The slider tube 29 has at least two slots, holes, or other openings 20*a*, 20*b* that direct flow of the cryogenic fluid from the inlet 15 to the top-fill outlet port 12*a* and/or the bottom-fill outlet port 13*a*, depending on the position of the slider tube 29. Although one slot is shown on each side of the slider tube, the slider tube may include more than two slots/holes. The holes or slots 20*a*, 20*b* may be any shape. They may be circular, rectangular, or any other known shape. Slot 20*a* may be a top-fill opening that comes into communication with top-fill port 12*a*. Slot 20*b* may be a bottom-fill opening that comes into communication with bottom-fill port 13*a*.

Figure 3A:
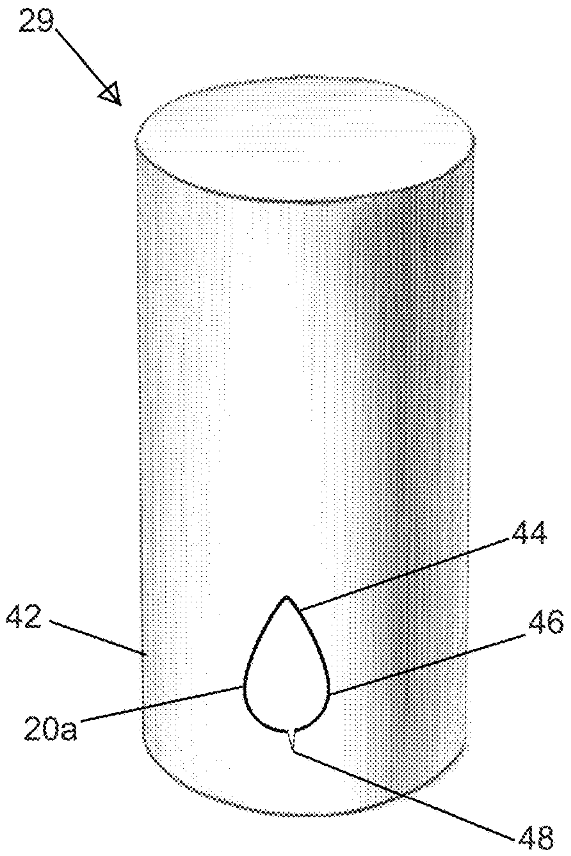
FIG. 3A is a perspective view of one embodiment of the slider tube, showing the slider tube opening for top filing.
Figure 3B:
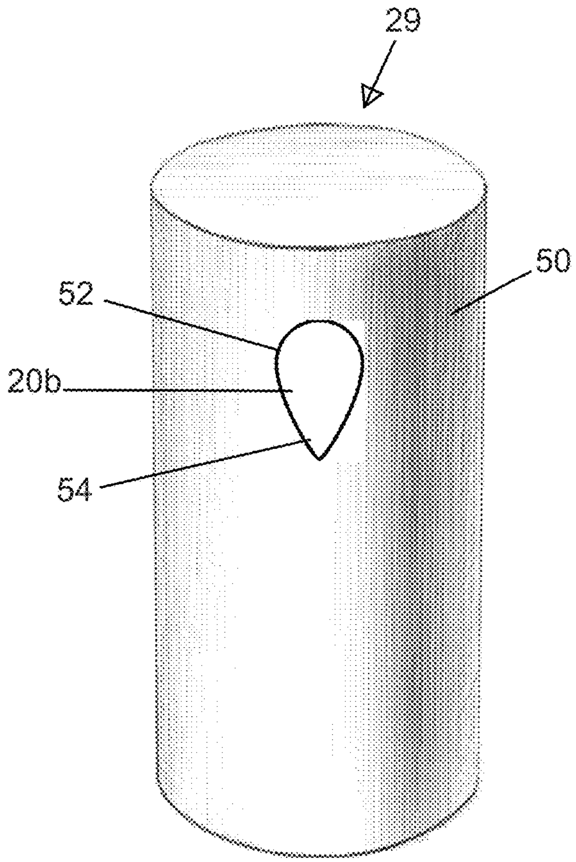
FIG. 3B is a perspective view of the slider tube of FIG. 3A, showing the slider tube opening for bottom filing.

Referring to FIGS. 3A and 3B, in one embodiment, the slots 20*a* and 20*b* are teardrop shaped so as to provide a constant flow rate independent on the position of the slider tube 29 within the slider tube cylinder 19. More specifically, the ports on the slider tube are sized such that the flow rate though the device is constant for the entire fill, until it goes into over-pressure. As a result, the transition from top-fill to bottom-fill causes no change, or at worst a gradual change, in flow rate. A rapid change in flow rate would trigger a fill termination, which is only desired when the device goes into over-pressure FIG. 3A shows slot 20*a* in the lower end portion 42 of the slider tube 29. In a teardrop shape or other alternative shapes (triangular, oval, etc.), the opening of slot 20*a* is smaller in the top portion 44 of the slot 20*a* and larger in the bottom portion 46 of the slot 20*a*. The slot 20*a* may have a smooth transition between the smaller and larger opening portions 44, 46 or it may have a stepped transition between the smaller and larger opening portions 44, 46. The slider tube 29 includes one or more crevices 48 extending downward from the bottom of slot 20*a*. The crevice(s) 48 may be channel(s), groove(s) or other surface texture(s) in the outer surface or wall of the slider tube 29. The crevices 48 are in fluid communication with slot 20*a*.

FIG. 3B shows slot 20*b* in the upper end portion 50 of the slider tube 29 and on the opposite side of the slider tube 29. The opening of slot 20*b* is large in the top portion 52 of the slot 20*b* and smaller in the bottom portion 54 of the slot 20*b*. The slot 20*b* may have a smooth transition between the smaller and larger opening portions or it may have a stepped transition between the smaller and larger opening portions.

Although, slots 20*a* and 20*b* are shown on opposite sides of the slider tube 29, they may be positioned elsewhere on the slider tube and in a different orientation relative to one another. In one alternative, the slots 20*a* and 20*b* may be located in the slider tube 29 or have a configuration such there is fluid flow through both top-fill port 12*a* and bottom-fill port 13*a*. As the slider tube 29 moves to gradually close the flow of fluid to one of ports 12*a* and 13*a*, flow to the other ports 12*a* or 13*a* is gradually opened. Thus, there is a point wherein there is simultaneous flow of fluid out of ports 12*a* and 13*a*. Alternatively, the slots 20*a* and 20*b* may be located in the slider tube 29 or have a configuration such fluid flows out of only one of the top-fill port 12*a* or bottom-fill port 13*a*. The movement of the slider tube 29 closes the flow of fluid to one of ports 12*a* and 13*a* before opening fluid flow to the other one of the ports 12*a* or 13*a*

A design element that may be exploited by the fact that the fill pressure (pressure of the fluid entering through inlet port 15) always exceeds tank pressure is the relationship between the cross-sectional area of piston shaft 30 and the weight of the piston-shaft-slider tube assembly. If the pressure drop from the body structure 18 to the cryogenic tank during normal fill operations is known, the weight of the piston-shaft-slider tube assembly may be selected to match the excess upward force on piston 21. Ideally, there is no net force on the piston-shaft slider tube assembly when cryogenic tank pressure exactly equals the setpoint pressure (the pressures in lower volume 27 and upper volume 23, respectively). The downward force on the piston 21=the force of gravity on the piston-shaft-slider tube assembly+(pressure in the upper volume 23×cross sectional area of the pressure comparison cylinder). The upward force on the piston 21=the pressure in lower volume 27×(the cross sectional area of pressure comparison cylinder−the cross-sectional area of piston shaft 30)+(the pressure in body structure 18×the cross-sectional area of the piston shaft 30).

The weight of the piston-shaft-slider tube assembly is ideally equal to the pressure drop from body structure 18 to the cryogenic tank multiplied by the cross-sectional area of shaft 30. However, it is not necessary (or possible) to have this tuned exactly because the pressure drop from the body structure 18 to the tank depends on the fill rate, which may vary slightly from one mobile delivery vehicle to another depending on vehicle capabilities.

The filling device 16 of FIG. 2A can be included in a cryogenic fluid delivery system, including a cryogenic fluid bulk tank (in fluid communication with inlet port 15 of FIG. 2A), or a cryogenic tank system. An example of the latter is indicated in general at 102 in FIG. 6. The system 102 includes a cryogenic tank 101 having an inner shell 114 and an outer shell 132, where the inner shell defines an interior of the tank. Cryogenic liquid 136 is stored within the interior of the inner shell 114 with a headspace 134 above occupied by cryogenic vapor 133.

Figure 6:
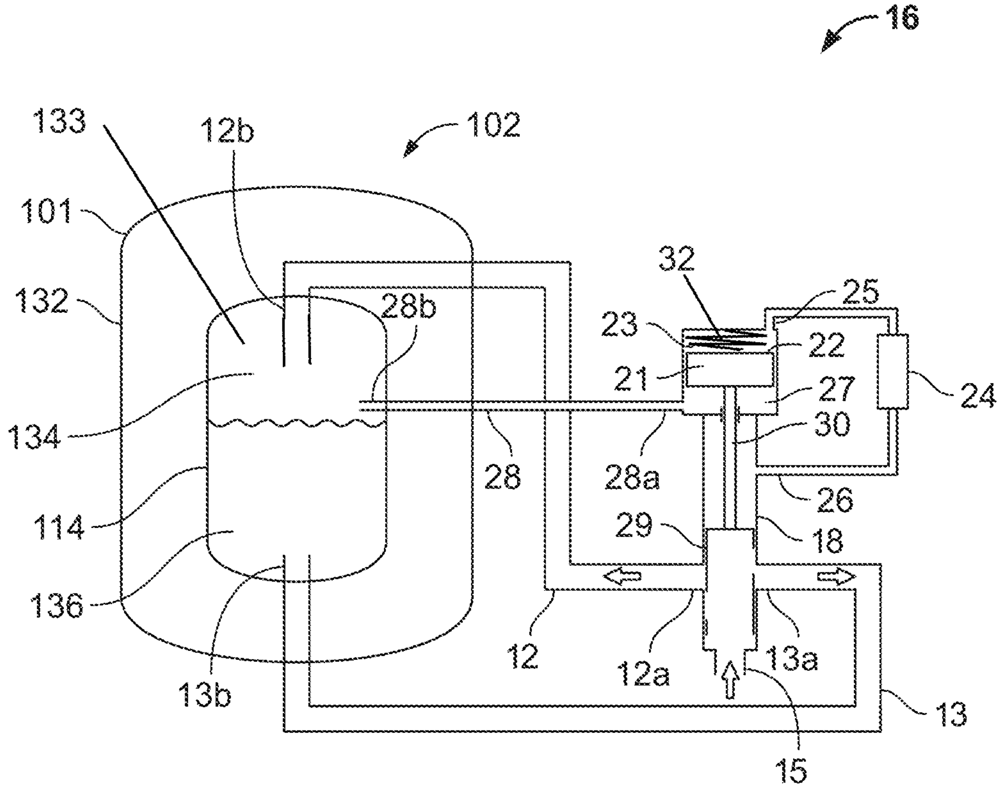
FIG. 6 is a schematic illustration of an embodiment of the filing device of the disclosure incorporated into a cryogenic tank system.

As illustrated in FIG. 6, the cryogenic tank 101 is connected to the filling device 16 by a number of lines. Pressure sensing line 28 connects the head space or vapor space 134 of the cryogenic tank 101 to the filling device 16. More specifically, pressure sensing line 28 connects the lower volume 27 of the cylinder housing at port 28*a* of the filling device to the headspace 134 of the inner shell 114 of the cryogenic tank at port 28*b*. Pressure sensing line 28 enables communication between the tank head space 134 and the filling device so that the lower volume 27 and cryogenic tank are maintained at the same pressure. The filling device 16 is also connected to cryogenic tank 101 by filling transfer lines 12 and 13. Top-fill line 12 connects the body structure 18 of filling device 16 at port 12*a* to the vapor space 134 of the inner shell 114 of the cryogenic tank at port 12*b*. Bottom-fill line 13 connects the body structure 18 of filling device 16 at port 13*a* to the cryogenic liquid 136 of the inner shell 114 of the cryogenic tank at port 13*b*. Although filling lines 12 and 13 are shown as being connected to the inner shell 114 at the top and bottom respectively, the filling lines may be connected to the vapor space and cryogenic liquid portion along either side of the inner shell as well. Preferably the top fill is able to spray into the vapor space at nearly any liquid fill level.

With reference to FIGS. 2A-6, a cryogenic fluid is provided from a delivery tank or other filling system to the filling device via inlet port 15. Referring to FIGS. 2A-2C, when the piston 21 and slider tube 29 are in the bottom most position, slot 20*b* of the slider tube is aligned with port 13*a*. Cryogenic fluid entering inlet port 15 flows through slider tube 29 and is diverted out of slot 20*b* and through bottom fill port 13*a*. When the slider tube 29 is in this position, slot 20*b* is aligned with bottom fill port 13*a*, as schematically shown in FIGS. 2A and 2C. Additionally, slot 20*a* is not aligned with port 12*a* and the wall of the slider tube 29 blocks top fill port 12*a*, preventing cryogenic fluid from entering port 12*a*. The position of slot 20*a* relative to bottom fill port 12*a* is schematically shown in FIG. 2B.

Figure 2B:
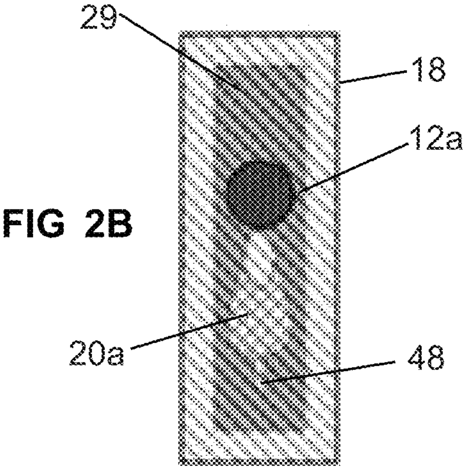
FIG. 2B is a schematic illustration showing the location of the top-fill port relative to the opening of the slider tube.
Figure 2C:
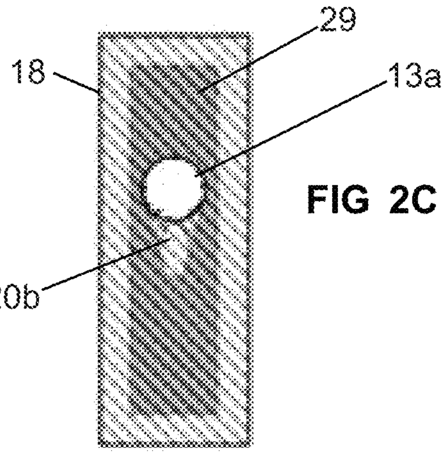
FIG. 2C is a schematic illustration showing the location of the bottom-fill port relative to the opening of the slider tube.
Figure 4B:
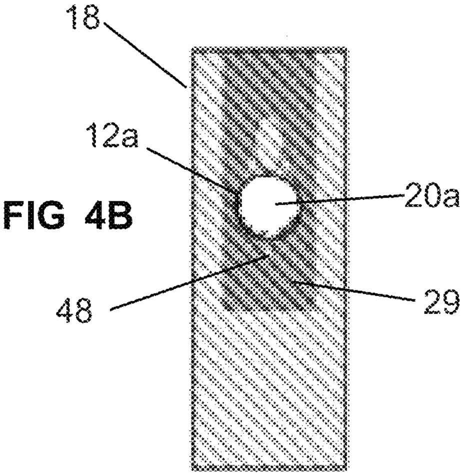
FIG. 4B is a schematic illustration showing the location of the top-fill port relative to the opening of the slider tube.
Figure 4C:
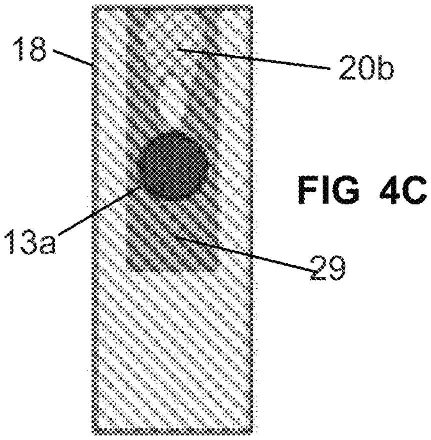
FIG. 4C is a schematic illustration showing the location of the bottom-fill port relative to the opening of the slider tube.

Referring to FIGS. 4A-4C, when the pressure within the cryogenic tank 101 exceeds the pressure setpoint of pressure regulator 24, the piston 21 moves upward and contacts over-pressure member 32 but is unable to compress the over-pressure member 32 due to the over-pressure member's preload. In other words, the tank pressure/pressure in the lower volume 27 of the pressure comparison cylinder is greater than the pressure of the upper volume 23, but the tank pressure/pressure in the lower volume 27 is less than and/or unable to overcome the combined force of the pressure of the upper volume 23 plus the force of the over-pressure member 32. Additionally, the slider tube 29 moves upward so that slot 20*a* is aligned with top-fill port 12*a* and slot 20*b* is not aligned with port 13*a*. In this position, the cryogenic fluid entering inlet port 15 and flowing through slider tube 29 is diverted out of slot 20*a* and into top-fill port 12*a*. The alignment between slot 20*a* and top-fill port 12*a* is schematically shown in FIG. 4B. Additionally, slot 20*b* is not aligned with port 13*a* and the wall of the slider tube 29 blocks top fill port 13*a*, preventing cryogenic fluid from entering port 13*a*. The alignment between slot 20*b* and bottom fill-port 13*a* is schematically shown in FIG. 2B. As mentioned above, tube slider 29 may gradually close off fluid flow to port 13*a* while simultaneously opening fluid flow to port 12*a*. Alternatively, the tube slider 29 may completely close off flow to port 13*a* before opening flow to port 12*a*.

Referring to FIG. 6, the cryogenic fluid entering tank 101 through top-fill port 12*b*, conducts a heat exchange with the vapor 133 in headspace 134, thereby collapsing the vapor and lowering the pressure in the tank 101. The lowering of pressure allows continued filling of the tank until the cryogenic liquid covers the top-fill port 12*b*.

Figure 5B:
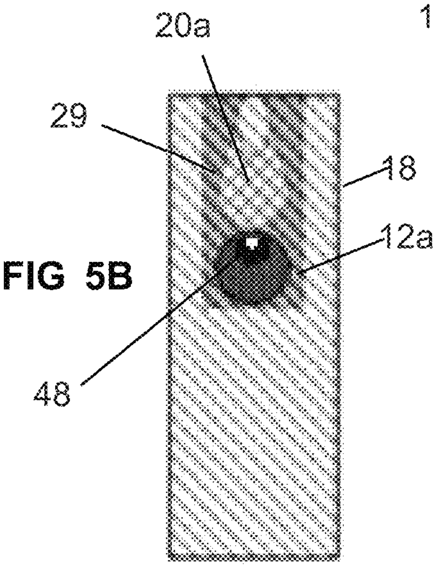
FIG. 5B is a schematic illustration showing the location of the top-fill port relative to the opening of the slider tube.
Figure 5C:
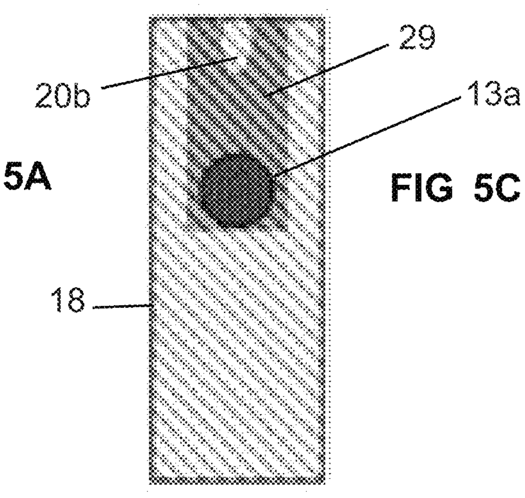
FIG. 5C is a schematic illustration showing the location of the bottom-fill port relative to the opening of the slider tube.

Turning to FIGS. 5A-5C, as filling of the tank 101 continues and the liquid level covers top-fill port 12*b* and port 28*b*, the pressure within the tank 101 is allowed to climb. This increases the pressure within lower volume 27 of the pressure comparison cylinder. Once the pressure within lower volume 27 is able to overcome the force of the over-pressure member 32 plus the pressure in upper volume 23, the piston 21 compresses the over-pressure member 32 against the top wall 34 of the pressure comparison cylinder. The over-pressure member 32 initially prevents the piston 21 from moving to its top-most position over a selected range of pressures in lower volume 27 to maintain the piston 21 and slider tube 29 in the top-fill position. When the over-pressure member 32 is a spring, the preload is selected so that the range of tank pressures between the piston 21/slider tube 29 top-fill position (FIG. 4A) and top-most position (FIG. 5A) is very tight (for example a few psi, in one alternative 200 to 210 psi). The over-pressure member 32 also results in providing a relatively rapid transition of the piston 21/slider tube 29 into the top-most position. The rapid transition causes a drastic pressure changes or pressure spikes in the inlet port 15. This triggers the pressure sensor of the delivery tank's automatic shut off. Referring to FIGS. 5A-5C, when piston 21 is in its top-most position, the wall of slider 29 fully blocks fluid flow into bottom-fill port 13*a* and mostly blocks flow into top-fill port 12*a*. At this point flow of cryogenic liquid into inlet port 15 for the delivery tank is shut off.

As mentioned above, slider tube 29, optionally, incudes one or more crevices 48 in communication with slot 20*a*. Referring to FIGS. 5A and 5B, when the piston 21 and slider tube 29 are in their top-most position, the one or more crevices 48 are in communication with slot 20*a* and port 12*a*. This prevents the piston 21 and slider tube 29 from being lodged in the top-most position. In other words, the crevices 48 provides a mechanism to move the piston 21 and slider tube 29 downward from the top-most position. When filing the tank 101 with liquid commences through inlet port 15 and the piston 21 and slider tube 29 are in their top-most position, an amount of cryogenic liquid flows into slider tube 29, through crevice(s) 48 and into top-fill port 12*a*. The cryogenic liquid then flows out of port 12*b* into the headspace 134 of the tank 101 (FIG. 6). The liquid collapses the vapor 133 in the headspace and lowers the pressure. This in turn lowers the pressure in lower volume 27 of the comparison cylinder and moves the piston and the slider tube downward so that slot 20*a* aligns with port 12*a*. As more liquid flows through port 12*a* and into tank 101 through port 12*b*, the vapor 133 in headspace 134 further collapses. As the pressure collapses, the piston 21 and slider tube 29 eventually move to the bottom-most position shown in FIG. 2A and the fill process continues through the bottom-fill port 13*a*.

Figure 7:
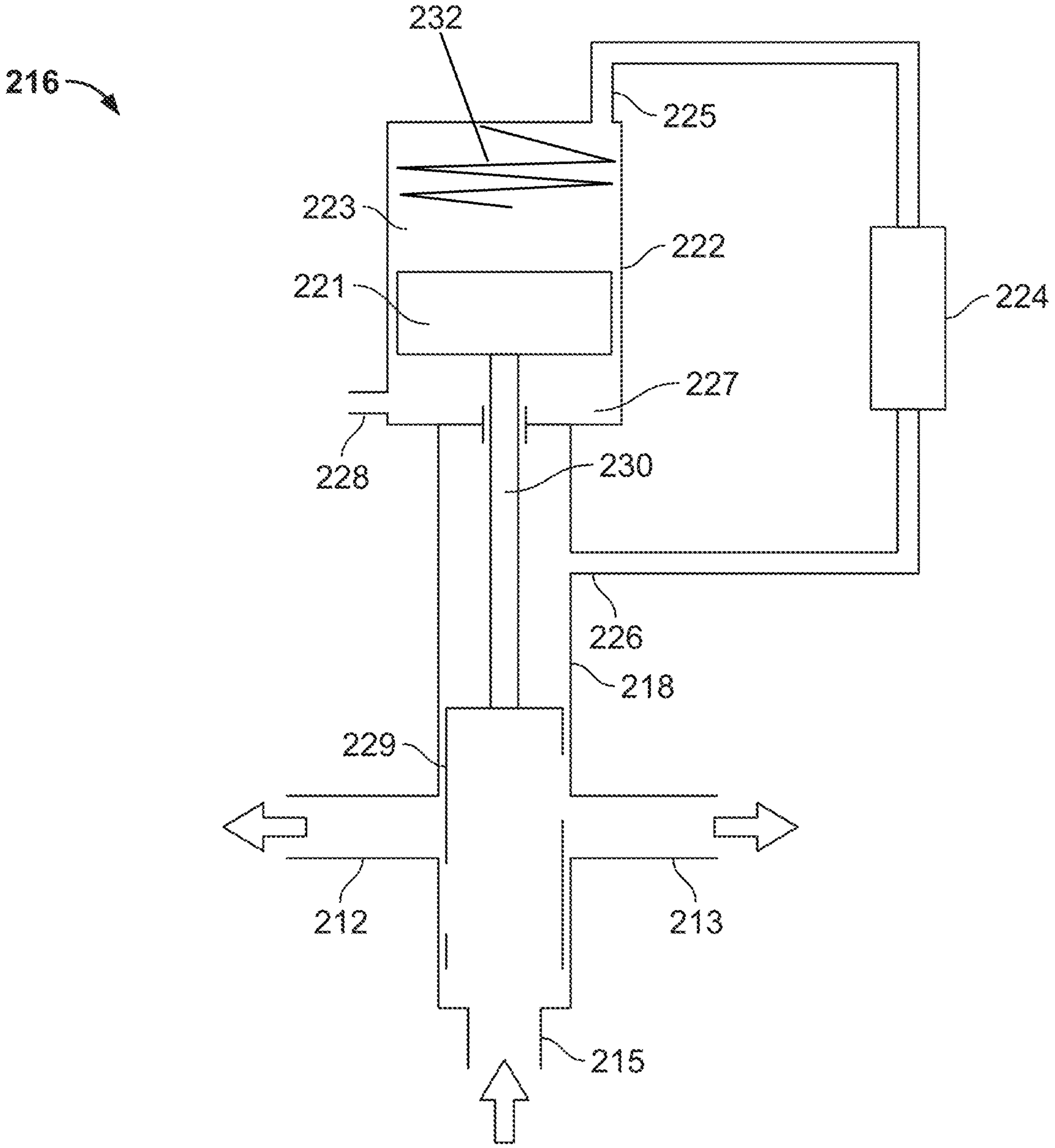
FIG. 7 is a schematic illustration of an alternative embodiment of the filling device of the disclosure.
Figure 8:
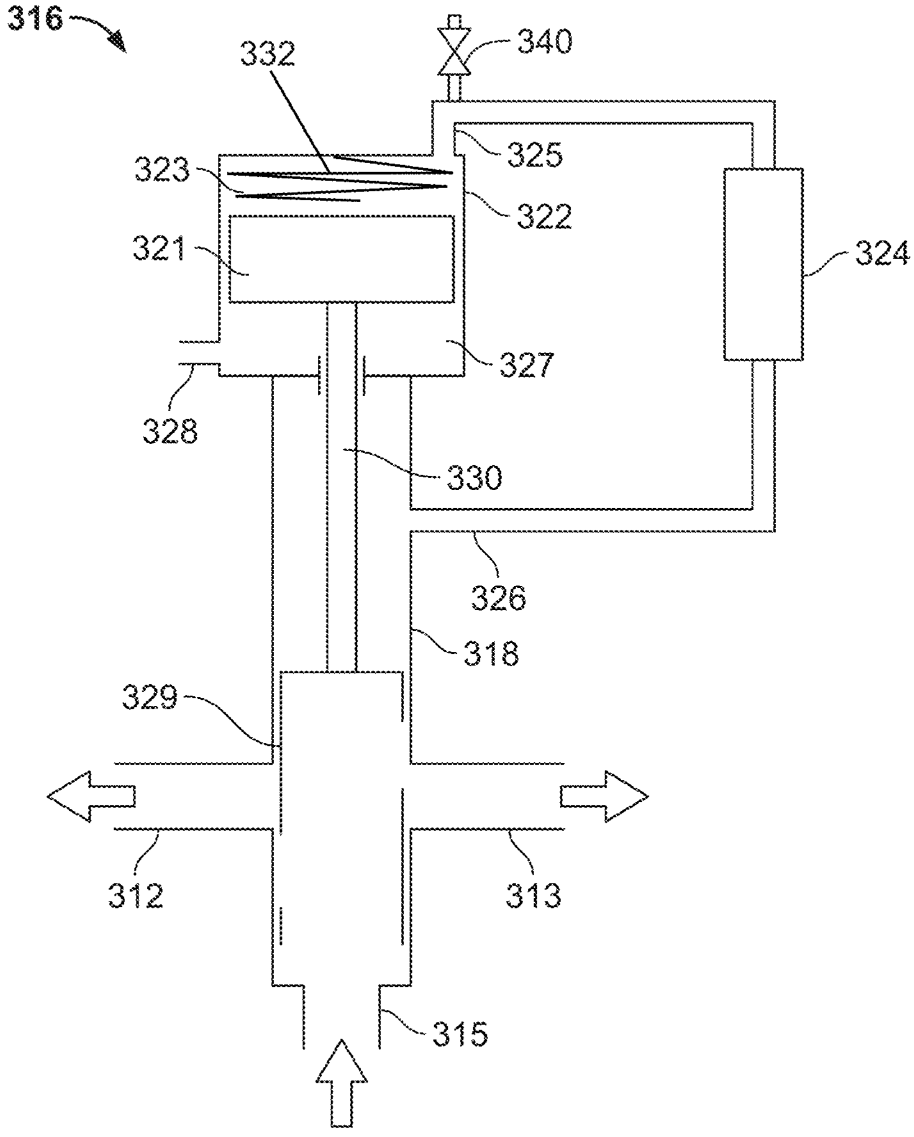
FIG. 8 is a schematic illustration of another alternative embodiment of the filling device of the disclosure.

As described with reference to FIG. 2A, the use of relieving pressure regulator 24 allows any excess pressure in upper volume 23 of the filling device 16 to vent to the atmosphere. Other embodiments that accomplish the same task without venting to atmosphere are illustrated in FIGS. 7 and 8. Coordinating components of FIGS. 7 and 8 are numbered similarly to the device components of the FIG. 2A and operate in the same manner.

In the device of FIG. 7, indicated in general at 216, the upper volume 223 of the pressure comparison cylinder is expanded. The functionality of the device 216 is otherwise identical to the device 16 of FIG. 2A. The combined volume of upper volume 223 and communication line 225 of FIG. 7 is made to be much larger than the displacement volume of the piston head 221 such that the pressure change is minimal throughout the stroke of the piston. A disadvantage of this approach, however, is that diurnal or annual temperature cycles may still cause the pressure within upper volume 223 to increase in relation to the gas temperature In the device of FIG. 8, indicated in general at 316, a back-pressure control device 340 (such as a back-pressure regulator, a relief valve, or a pressure relieving regulator) has been added to and is in fluid circuit with communication line 325 with a setpoint slightly above the setpoint of a (non-relieving) pressure regulator 324. The functionality of the device 316 is otherwise identical to the device 16 of FIG. 2A.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A device for filling a cryogenic tank, comprising:
- a body structure including:
  - an inlet port for receiving fluid from a delivery device;
  - a top-fill outlet port configured to connect to a top-fill line in communication with a cryogenic tank;
  - a bottom-fill outlet port configured to connect to a bottom-fill line in communication with a cryogenic tank;
  - a slider tube cylinder;
- a cylinder housing connected to the body structure defining a pressure comparison cylinder having an upper volume and a lower volume, the lower volume in fluid communication with a cryogenic tank;
- a piston slidably positioned in the pressure comparison cylinder;
- an over-pressure member positioned in the upper volume of the pressure comparison cylinder, the piston contacting the over-pressure member as the piston slides upward in the pressure comparison cylinder;
- a piston shaft connected to the piston;
- a pressure regulator in fluid communication with the upper volume of the pressure comparison cylinder and the slider tube cylinder;
- a slider tube connected to the piston shaft and slidably positioned within the slider tube cylinder, said slider tube cylinder configured to direct fluid to a top-fill line through the top-fill outlet port when a pressure in the lower volume exceeds a pressure setpoint and to direct fluid to a bottom-fill line through the bottom-fill port when the pressure in the lower volume is below a pressure setpoint.

2. The filling device of claim 1, wherein the slider tube has at least two openings for directing fluid.

3. The filling device of claim 2, wherein the openings are tear shaped.

4. The filling device of claim 2, wherein one of the at least two openings comprises a top-fill opening that directs fluid to the top-fill port.

5. The filling device of claim 4, wherein the slider tube includes one or more crevices in communication with the top-fill opening.

6. The filling device of claim 5, wherein the one or more crevices comprise a channel in a wall of the slider tube.

7. The filling device of claim 5, wherein the one or more crevices are configured to come into communication with the top-fill port.

8. The filling device of claim 1, wherein the over-pressure member comprises a spring.

9. The filling device of claim 8, wherein the spring comprises a coil spring.

10. The filling device of claim 8, further including a finger extending downward from the spring.

11. The filling device of claim 1, wherein the pressure regulator is a pressure relieving regulator.

12. The filling device of claim 1, wherein the weight of the piston, shaft and slider tube is about equal to the pressure drop from the body structure to the tank while filling the cryogenic tank multiplied by the cross-sectional area of the piston shaft.

13. The filling device of claim 1, wherein the upper volume of the cylinder housing is larger than the lower volume of the cylinder housing.

14. The filling device of claim 1, further comprising a second pressure regulator in fluid circuit between the upper volume and the pressure regulator.

15. The filling device of claim 1, further comprising a seal between the piston and the pressure comparison cylinder.

16. The filling device of claim 1, further comprising a seal around the piston shaft configured to prevent fluid from flowing between the pressure comparison cylinder and the body structure.

17. The filling device of claim 1, wherein the over-pressure member comprises a coil spring having a preload that prevents upward movement of the piston until a pressure within the lower volume of the pressure comparison cylinder exceeds a predetermined pressure level.

18. A device for filling a cryogenic tank, comprising:
- a body structure including:
  - an inlet port for receiving fluid from a delivery device;
  - a top-fill outlet port configured to connect to a top-fill line in communication with a cryogenic tank;
  - a bottom-fill outlet port configured to connect to a bottom-fill line in communication with a cryogenic tank;
  - a slider tube cylinder;

a cylinder housing connected to the body structure defining a pressure comparison cylinder having an upper volume and a lower volume, the lower volume in fluid communication with a cryogenic tank;

a piston slidably positioned in the pressure comparison cylinder;

a piston shaft connected to the piston;

a pressure regulator in fluid communication with the upper volume of the pressure comparison cylinder and the slider tube cylinder;

a slider tube connected to the piston shaft and slidably positioned within the slider tube cylinder, said slider tube having a top-fill opening configured to direct fluid through the top-fill outlet port and a bottom-fill opening configured to direct fluid through the bottom-fill; and the slider tube including one or more crevices in fluid communication with the top-fill opening.

19. The filing device of claim 17, wherein the one or more crevices comprise a channel in a wall of the slider tube.

20. The filing device of claim 17, wherein the one or more crevices are configured to come into communication with the top-fill port.

21. The filing device of claim 17, further comprising an over-pressure member positioned in the upper volume of the pressure comparison cylinder, the piston contacting the over-pressure member as the piston slides upward in the pressure comparison cylinder.

* * * * *